US011905907B2

(12) United States Patent
Takaya et al.

(10) Patent No.: US 11,905,907 B2
(45) Date of Patent: Feb. 20, 2024

(54) INJECTION CONTROL DEVICE

(71) Applicant: DENSO CORPORATION, Kariya (JP)

(72) Inventors: Keisuke Takaya, Kariya (JP); Hiroyuki Fukuda, Kariya (JP); Kosuke Kato, Kariya (JP)

(73) Assignee: DENSO CORPORATION, Kariya (JP)

( * ) Notice: Subject to any disclaimer, the term of this patent is extended or adjusted under 35 U.S.C. 154(b) by 148 days.

(21) Appl. No.: 17/476,018

(22) Filed: Sep. 15, 2021

(65) Prior Publication Data

US 2022/0090555 A1 Mar. 24, 2022

(30) Foreign Application Priority Data

Sep. 18, 2020 (JP) ................................ 2020-157465

(51) Int. Cl.
*F02D 41/20* (2006.01)
*F02D 41/24* (2006.01)

(52) U.S. Cl.
CPC .......... *F02D 41/20* (2013.01); *F02D 41/247* (2013.01); *F02D 2041/2006* (2013.01); *F02D 2041/2051* (2013.01); *F02D 2041/2055* (2013.01)

(58) Field of Classification Search
CPC .................. F02D 41/20; F02D 41/247; F02D 2041/2006; F02D 2041/2051; F02D 2041/2055
See application file for complete search history.

(56) References Cited

U.S. PATENT DOCUMENTS

2016/0237935 A1 8/2016 Tanaka et al.
2017/0335789 A1 11/2017 Kiuchi
2020/0072153 A1 3/2020 Inaba
2020/0248642 A1 * 8/2020 Yamamoto .......... F02D 41/3005
2022/0090556 A1 3/2022 Kato et al.

FOREIGN PATENT DOCUMENTS

EP 1703109 A2 * 9/2006 ............ F02D 41/20
JP 2016-183597 A 10/2016
WO WO-2013191267 A1 * 12/2013 ............ F02D 41/20
WO WO-2019087899 A1 * 5/2019 ............ F02D 41/20

OTHER PUBLICATIONS

U.S. Appl. No. 17/475,855, filed Sep. 15, 2021, Takaya et al.

* cited by examiner

*Primary Examiner* — John M Zaleskas
*Assistant Examiner* — Joshua Campbell
(74) *Attorney, Agent, or Firm* — POSZ LAW GROUP, PLC

(57) ABSTRACT

An injection control device opens and closes a fuel injection valve by driving the fuel injection valve with a current to control fuel injection to an internal combustion engine. The injection control device includes: a booster circuit that boosts a battery voltage; a boosting control unit that performs boosting control on the booster circuit; and a charge control setting unit that sets charge permission or charge prohibition for the booster circuit to the boosting control unit.

7 Claims, 6 Drawing Sheets

INJECTION CONTROL DEVICE

CROSS REFERENCE TO RELATED APPLICATION

The present application claims the benefit of priority from Japanese Patent Application No. 2020-157465 filed on Sep. 18, 2020. The entire disclosure of the above application is incorporated herein by reference.

TECHNICAL FIELD

The present disclosure relates to an injection control device that opens and closes a fuel injection valve by driving the valve with a current to control fuel injection to an internal combustion engine.

BACKGROUND

An injection control device opens and closes a fuel injection valve called an injector by driving the valve with a current to control fuel injection to an internal combustion engine such as a gasoline engine of an automobile. The injection control device applies a high voltage to the fuel injection valve to control the valve opening. That is, the injection control device includes a booster circuit for boosting a battery voltage to be a reference power supply voltage of a power supply circuit and a boosting control unit for boosting and controlling the booster circuit. The injection control device boosts the battery voltage with the booster circuit to generate a boosting voltage and applies the generated boosting voltage to the fuel injection valve to control the valve opening. The injection control device detects an inflection point of a waveform of the current or voltage with which the fuel injection valve is energized to detect a valve-closing timing of the fuel injection valve. The injection control device detects a time from an on-to-off switching timing of an energization to a valve-closing timing as a valve-closing detection time and learns the detected valve-closing detection time to improve the injection accuracy.

It has been found that in the injection control device, charge noise may be generated by boosting control, and at the time of controlling the opening and closing of the valves by monitoring the energization current of the fuel injection valve, when the charge noise generated by the boosting control is transmitted in a wiring board or a power supply system path, the current monitoring accuracy deteriorates. When the current monitoring accuracy deteriorates, the injection amount varies, the exhaust emission deteriorates, and the fuel consumption deteriorates. Under such circumstances, in a comparative configuration, the boosting control is prohibited for a certain time so that the valve-closing detection learning is not adversely affected by the generation of the charge noise.

SUMMARY

An injection control device opens and closes a fuel injection valve by driving the fuel injection valve with a current to control fuel injection to an internal combustion engine. The injection control device includes: a booster circuit that boosts a battery voltage; a boosting control unit that performs boosting control on the booster circuit; and a charge control setting unit that sets charge permission or charge prohibition for the booster circuit to the boosting control unit.

BRIEF DESCRIPTION OF DRAWINGS

The above and other features and advantages of the present disclosure will be more clearly understood from the following detailed description with reference to the accompanying drawings. In the accompanying drawings.

DETAILED DESCRIPTION

However, in the configuration in which the boosting control is prohibited for a certain period of time, a difficulty occurs in which the charge possible time per cycle of the internal combustion engine is reduced, and the charge possible time cannot be ensured sufficiently. In order to solve such a difficulty, it is conceivable to form a booster circuit to be a circuit chargeable at high speed, but in a configuration in which the circuit chargeable at high speed is provided, new difficulties occur, such as an increase in the size of the circuit and a cost increase.

One example of the present disclosure provides an injection control device that can appropriately enhance the injection accuracy by appropriately learning a valve-closing detection time and appropriately ensure the charge possible time.

According to one example, an injection control device opens and closes a fuel injection valve by driving the valve with a current to control fuel injection to an internal combustion engine. The injection control device includes: a booster circuit that boosts a battery voltage; a boosting control unit that performs boosting control on the booster circuit; and a charge control setting unit that sets charge permission or charge prohibition for the booster circuit to the boosting control unit. The charge control setting unit sets the charge permission or the charge prohibition for the booster circuit to the boosting control unit according to an injection type.

According to the above-described configuration, it is selected whether to prohibit or permit the charging of the booster circuit according to the injection type. In the case of a specific injection among multiple types of injections, the charge prohibition is set to the boosting control unit, and the charging of the booster circuit is prohibited. On the other hand, in the case of injection other than the specific injection, the charge permission is set to the boosting control unit, and the charging of the booster circuit is permitted. That is, in the case of the injection for performing the valve-closing detection learning, it is possible to appropriately improve the injection accuracy by prohibiting the charging of the booster circuit to appropriately learn the valve-closing detection time. On the other hand, in the case of the injection other that the injection for performing the valve-closing detection learning, it is possible to appropriately secure the chargeable time by permitting the charging of the booster circuit. This eliminates the need for the booster circuit to be a circuit chargeable at high speed, and it is possible to appropriately enhance the injection accuracy by appropriately learning the valve-closing detection time and to appropriately ensure the charge possible time.

Figure 1:
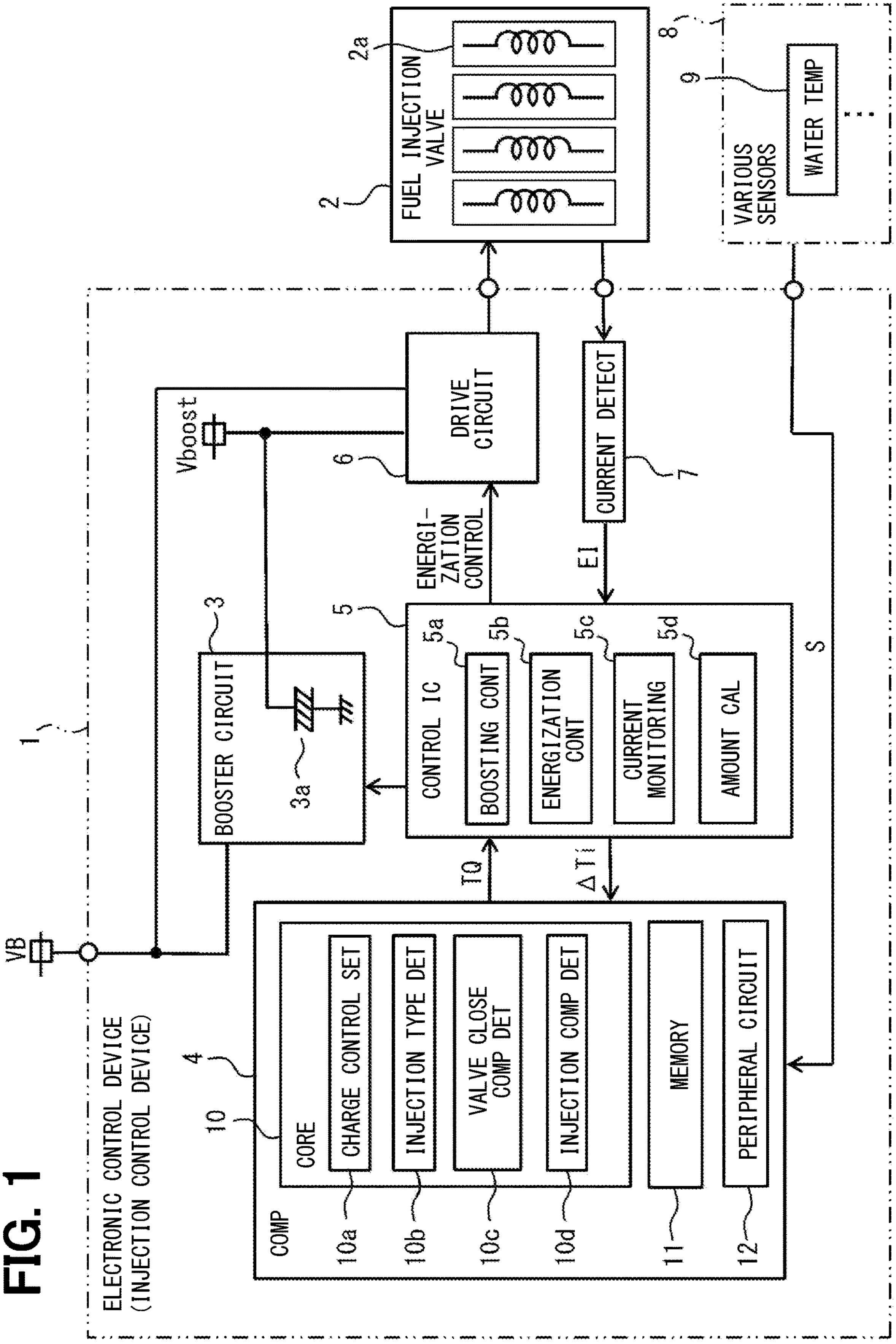
FIG. 1 is a functional block diagram illustrating an embodiment and illustrating an electrical configuration.

Hereinafter, an embodiment applied to direct injection control of a gasoline engine of an automobile as an internal combustion engine will be described with reference to the drawings. An electronic control unit 1 as an injection control device according to the present embodiment is referred to as an ECU and controls fuel injection of a fuel injection valve 2 provided in each cylinder of an engine, as illustrated in FIG. 1. The fuel injection valve 2, also referred to as an injector, energizes a solenoid coil 2*a* to drive a needle valve, thereby directly injecting fuel into each cylinder of the engine. Although FIG. 1 illustrates a four-cylinder engine, a three-cylinder engine, a six-cylinder engine, an eight-cylinder engine, and the like can be also used. Further, an injection control device for a diesel engine can be also used.

The electronic control unit 1 includes a booster circuit 3, a microcomputer 4, a control integrated circuit (IC) 5, a drive circuit 6, and a current detection unit 7. In the drawings, the microcomputer 4 may be also referred to as COMP. The microcomputer 4 includes one or more cores 10, a memory 11 such as read-only memory (ROM) and random-access memory (RAM), and a peripheral circuit 12 such as an analog-to-digital (A/D) converter. The microcomputer 4 receives input of sensor signals S from various sensors 8 for detecting the operating state of the engine. The microcomputer 4 calculates an energization instruction TQ on the basis of the program stored in the memory 11 and the sensor signals S input from the various sensors 8, as described later.

The various sensors 8 include a water temperature sensor 9 that detects the temperature of the cooling water of the engine. Although not illustrated, in addition to the water temperature sensor 9 described above, the various sensors 8 also include an air-fuel ratio (A/F) sensor that detects an air-fuel ratio of exhaust gas, a crank angle sensor that detects the crank angle of the engine, an airflow meter that detects the intake air amount of the engine, a fuel pressure sensor that detects the fuel pressure when the fuel is injected, a throttle opening sensor that detects a throttle opening, and the like. In FIG. 1, the various sensors 8 are illustrated in a simplified manner.

In the microcomputer 4, the core 10 grasps the load of the engine from the sensor signals S input from the various sensors 8 and calculates the required fuel injection amount of the fuel injection valve 2 on the basis of the engine load. When calculating the required fuel injection amount of the fuel injection valve 2, the core 10 then calculates an energization instruction time Ti for the energization instruction TQ on the basis of the calculated fuel injection amount and the fuel pressure at the time of injecting the fuel detected by the fuel pressure sensor. The core 10 calculates the injection command timing for each cylinder from the sensor signals S input from the various sensors 8 and outputs the energization instruction TQ to the control IC 5 at the calculated injection command timing. In this case, although a detailed description is omitted, the core 10 calculates an A/F correction amount so as to become a target air-fuel ratio on the basis of the air-fuel ratio detected by the A/F sensor, and performs air-fuel ratio feedback control. Further, the core 10 performs A/F learning on the basis of the history of A/F correction and adds the learning correction value to the calculation of the A/F correction amount.

The control IC 5 is, for example, an integrated circuit device using an application-specific integrated circuit (ASIC) and, although not illustrated, the control IC 5 includes a control body such as a logic circuit and a central processing unit (CPU), a storage unit such as RAM, ROM, an erasable programmable read-only memory (EEPROM), comparator equipment using a comparator, and the like, for example. The control IC 5 performs the current control of the fuel injection valve 2 via the drive circuit 6 in accordance with the hardware and software configuration of the control IC 5. The control IC 5 has functions as a boosting control unit 5*a*, an energization control unit 5*b*, a current monitoring unit 5*c*, and an area correction amount calculation unit 5*d*. In the drawings, the boosting control unit 5*a* may be also referred to as BOOSTING CONT, the energization control unit 5*b* may be also referred to as ENERGIZATION CONT, the current monitoring unit 5*c* may be also referred to as CURRENT MONITORING, and the area correction amount calculation unit 5*d* may be also referred to as AMOUNT CAL.

Although not illustrated, the booster circuit 3 receives input of a battery voltage VB, boosts the input battery voltage VB, and charges the booster capacitor 3*a* serving as a charge unit with a boosting voltage Vboost to a fully charged voltage. The battery voltage VB is, for example, 12 volts, and the boosting voltage Vboost is, for example, 65 volts. The boosting voltage Vboost is supplied to the drive circuit 6 as power for driving the fuel injection valve 2. The boosting control unit 5*a* performs the boosting control of the booster circuit 3 and controls the charge of the booster circuit 3.

The drive circuit 6 receives the input of the battery voltage VB and the boosting voltage Vboost. Although not illustrated, the drive circuit 6 includes a transistor for applying the boosting voltage Vboost to the solenoid coil 2*a* of the fuel injection valve 2 in each cylinder, a transistor for applying the battery voltage VB, a transistor for selecting a cylinder to be energized, and the like. Each transistor of the drive circuit 6 is turned on and off by the energization control unit 5*b*. The drive circuit 6 applies a voltage to the solenoid coil 2*a* to drive the fuel injection valve 2 on the basis of the energization control of the energization control unit 5*b*.

The current detection unit 7 includes a current detection resistor (not illustrated) or the like and detects a current flowing through the solenoid coil 2*a*. The current monitoring unit 5*c* includes, for example, a comparator (not illustrated), an A/D converter, or the like and monitors, through the current detection unit 7, an energization current value EI actually flowing through the solenoid coil 2*a* of the fuel injection valve 2 in each cylinder.

The control IC 5 stores an energization current profile PI showing an ideal relationship between an energization time Ti and an energization current value EI so as to obtain an integrated energization current value of the fuel injection valve 2 corresponding to the energization instruction TQ input from the microcomputer 4. The energization control unit 5*b* performs current control on the fuel injection valve 2 via the drive circuit 6 on the basis of the energization current profile PI. In the control of the fuel injection valve 2, the gradient of the energization current of the fuel injection valve 2 is lower than the energization current profile PI due to various factors such as ambient temperature environment and aging deterioration, and the actual injection amount is lower than the commanded injection amount. On the other hand, at the time of controlling the energization of the fuel injection valve 2, a fuel injection amount proportional to the integrated value of the energization current is obtained.

The area correction amount calculation unit 5_d_ calculates an energization time correction amount ΔTi by calculating the area correction amount on the basis of the difference between the integrated current of the energization current profile PI and the integrated current of the energization current value EI of the current that actually flows in the fuel injection valve 2 and is detected by the current detection unit 7 so that the current values become equivalent. In this case, for example, the area correction amount calculation unit 5_d_ calculates a time for reaching a first current threshold and calculates a time for reaching a second current threshold for each of the energization current profile PI and the energization current value EI. The area correction amount calculation unit 5_d_ then estimates an area difference from the calculated times, calculates an area correction amount so as to obtain an area equivalent to the estimated area difference, and calculates the energization time correction amount ΔTi. The area correction amount calculation unit 5_d_ may adopt a method other than the method described above and calculate the area correction amount to calculate the energization time correction amount ΔTi. It is possible to obtain the required appropriate fuel injection amount of the fuel injection valve 2 by the corrected energization instruction TQ, obtained by the area correction amount calculation unit 5_d_ correcting the current area, correcting the energization time of the energization instruction TQ in accordance with the energization time correction amount ΔTi, and correcting the energization time. Note that the area correction amount calculation unit 5_d_ outputs the energization time correction amount ΔTi calculated in this manner to the microcomputer 4.

The microcomputer 4 has a function of performing valve-closing detection learning in order to enhance injection accuracy. That is, the microcomputer 4 detects the inflection point of the waveform of the current or voltage with which the fuel injection valve 2 is energized, detects the valve-closing timing of the fuel injection valve 2, detects a time from the on-to-off switching timing of the corrected energization instruction TQ to the valve-closing timing as a valve-closing detection time, and learns the detected valve-closing detection time.

It has been found that in the injection control device 1, charge noise may be generated by boosting control, and the current monitoring accuracy deteriorates when the charge noise generated by the boosting control is transmitted in a wiring board or a power supply system path at the time of controlling the opening and closing of the valves by monitoring the energization current of the fuel injection valve 2. Therefore, there is a configuration in which the boosting control is prohibited fora certain period of time so that the valve-closing detection learning is not adversely affected by the generation of the charge noise. However, in such a configuration, the charge possible time per cycle of the internal combustion engine is reduced, and the charge possible time cannot be ensured sufficiently. Further, it is conceivable to form a booster circuit 3 to be a circuit chargeable at high speed, but in a configuration in which the circuit chargeable at high speed is provided, new problems occur, such as an increase in the size of the circuit and a cost increase.

Therefore, in the present embodiment, the following structure is adopted. The core 10 has functions as, a charge control setting unit 10_a_, an injection type determination unit 10_b_, a valve closing detection completion determination unit 10_c_, and an injection completion determination unit 10_d_. In the drawings, the charge control setting unit 10_a_ may be also referred to as CHARGE CONTROL SET, the injection type determination unit 10_b_ may be also referred to as INJECTION TYPE DET, the valve closing completion determination unit 10_c_ may be also referred to as VALVE CLOSE COMP DET, and the injection completion determination unit 10_d_ may be also referred to as INJECTION COMP DET.

The charge control setting unit 10_a_ outputs a charge permission command to the boosting control unit 5_a_ and sets charge permission for driving the booster circuit 3 to the boosting control unit 5_a_. The boosting control unit 5_a_ receives the input of the charge permission command from the charge control setting unit 10_a_, and when the charge permission is set by the charge control setting unit 10_a_, the boosting control unit 5_a_ drives the booster circuit 3 to charge the booster capacitor 3_a_ with the boosting voltage Vboost to a fully charged voltage.

On the other hand, the charge control setting unit 10_a_ outputs a charge prohibition command to the boosting control unit 5_a_ and sets charge prohibition against the booster circuit 3 to the boosting control unit 5_a_. The boosting control unit 5_a_ receives the input of the charge prohibition command from the charge control setting unit 10_a_, and when the charge prohibition is set by the charge control setting unit 10_a_, the boosting control unit 5_a_ stops the booster circuit 3 in a charge prohibition band designated by the input charge prohibition command. In this case, by the booster circuit 3 being stopped in the charge prohibition band, charge noise due to the boosting control is not generated, and the current monitoring accuracy does not deteriorate.

Figure 2:
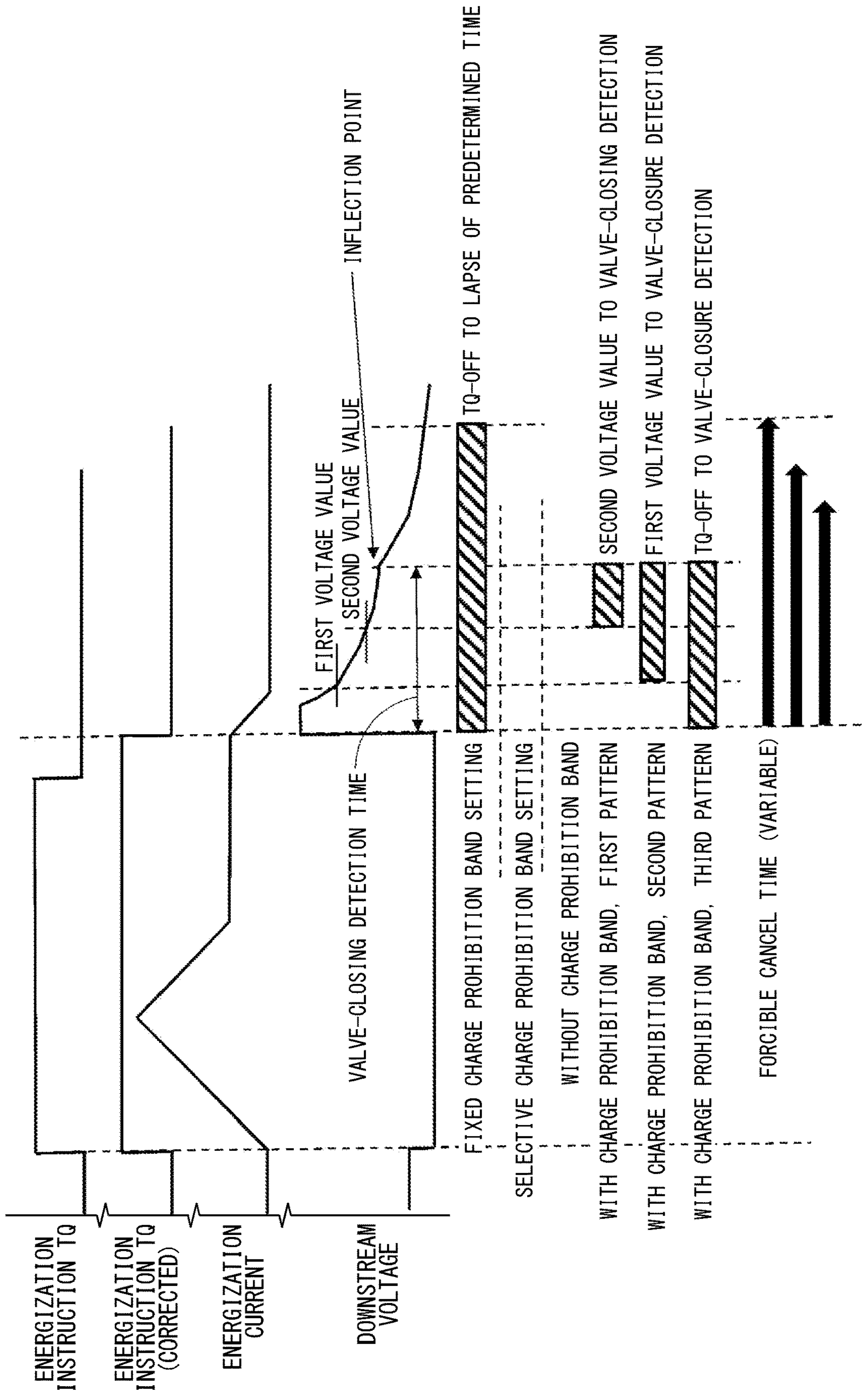
FIG. 2 is a timing chart.

Here, a mode of detecting the valve-closing detection time will be described. As illustrated in FIG. 2, at the injection command timing, the injection control device 1 switches the energization instruction TQ from off to on and starts supplying the energization current to the fuel injection valve 2. When the supply of the energization current to the fuel injection valve 2 is started, the fuel injection valve 2 is opened, the lift amount of the needle valve increases, and fuel is injected into the cylinder of the engine. Thereafter, the injection control device 1 switches the corrected energization instruction TQ by the current area correction from off to on and stops the supply of the energization current to the fuel injection valve 2. When the supply of the energization current to the fuel injection valve 2 is stopped, the downstream voltage of the fuel injection valve 2 is generated. Then, when the lift amount of the needle valve decreases, and the fuel injection valve 2 is closed, an electromotive force is generated by a magnetic flux change due to the sitting at the lift position, and an inflection point occurs in the downstream voltage of the fuel injection valve 2. The core 10 detects the timing at which the inflection point occurs as the valve-closing timing of the fuel injection valve 2 and detects the time from the on-off switching timing of the corrected energization instruction TQ to the valve-closing timing as the valve-closing detection time.

The charge control setting unit 10_a_ outputs the charge prohibition command to the boosting control unit 5_a_ in the following manner during the period in which the valve-closing detection time is detected, and stops the booster circuit 3 in the charge prohibition band designated by the charge prohibition command. In this case, the charge control setting unit 10_a_ sets the charge prohibition band by either a fixed charge prohibition band setting method which sets a period from TQ-off until the lapse of a predetermined time as the charge prohibition band, or a selective charge prohibition band setting method which selects and determines the charge prohibition band.

In the fixed charge prohibition band setting method, the charge control setting unit 10*a* notifies the boosting control unit 5*a* of a predetermined time and sets as the charge prohibition band a period from the on-to-off switching timing of the corrected energization instruction TQ to the timing at which the predetermined time elapses. Here, the predetermined time is sufficiently long with respect to the valve-closing detection time, and the charge control setting unit 10*a* sets the entire period of the valve-closing detection time as the charge prohibition band.

In the selective charge prohibition band setting method, the charge control setting unit 10*a* selects one of several patterns and sets a partial or entire period of the valve-closing detection time as the charge prohibition band. For example, as a first pattern, the charge control setting unit 10*a* does not set as the charge prohibition band a period from the on-to-off switching timing of the corrected energization instruction TQ to a timing at which the downstream voltage of the fuel injection valve 2 decreases to a second voltage value (e.g., 30 volts) in the valve-closing detection time, but sets as the charge prohibition band a period from a timing at which the downstream voltage of the fuel injection valve 2 decreases to the second voltage value to the valve-closing timing.

For example, as a second pattern, the charge control setting unit 10*a* does not set as the charge prohibition band a period from the on-to-off switching timing of the corrected energization instruction TQ to a timing at which the downstream voltage of the fuel injection valve 2 decreases to a first voltage value (e.g., 60 volts) in the valve-closing detection time, but sets as the charge prohibition band a period from a timing at which the downstream voltage of the fuel injection valve 2 decreases to the first voltage value to the valve-closing timing.

For example, as a third pattern, the charge control setting unit 10*a* sets as the charge prohibition band a period from the on-to-off switching timing of the corrected energization instruction TQ to the valve-closing timing, that is, the entire period of the valve-closing detection time, in the valve-closing detection time. In some cases, the charge control setting unit 10*a* does not set the entire period of the valve-closing detection time as the charge prohibition band. In the present embodiment, the three patterns have been exemplified as patterns for arbitrarily setting the charge prohibition band, but the charge prohibition band may be set by a pattern other than the exemplified patterns.

Further, the charge control setting unit 10*a* sets a forcible cancel time starting from the on-to-off switching timing of the corrected energization instruction TQ on the chance that the valve closing may not be detected. The forcible cancel time is a time for forcibly canceling the charge prohibition band. In this case, the charge control setting unit 10*a* can variably set the forcible cancel time and sets a time longer than the valve-closing detection time as the forcible cancel time.

The injection type determination unit 10*b* determines whether the injection type is normal injection, minute injection, or learning minute injection. Here, the normal injection is injection that contributes to driving of the engine. The minute injection is injection that has a shorter injection time than that of the normal injection and contributes to the driving of the engine. The learning minute injection is injection that is different from the normal injection and the minute injection and does not contribute to the driving of the engine.

The valve closing detection completion determination unit 10*c* determines whether the closing detection is completed. The injection completion determination unit 10*d* determines whether the injection of the fuel injection valve 2 is completed. In this case, the injection completion determination unit 10*d* determines that the injection of the fuel injection valve 2 has been completed, based on the determination, by the valve closing detection completion determination unit 10*c*, that the valve closing detection has been completed. On the other hand, the injection completion determination unit 10*d* determines that the injection of the fuel injection valve 2 has not been completed, based on the determination, by the valve closing detection completion determination unit 10*c*, that the valve closing detection has not been completed.

Figure 3:
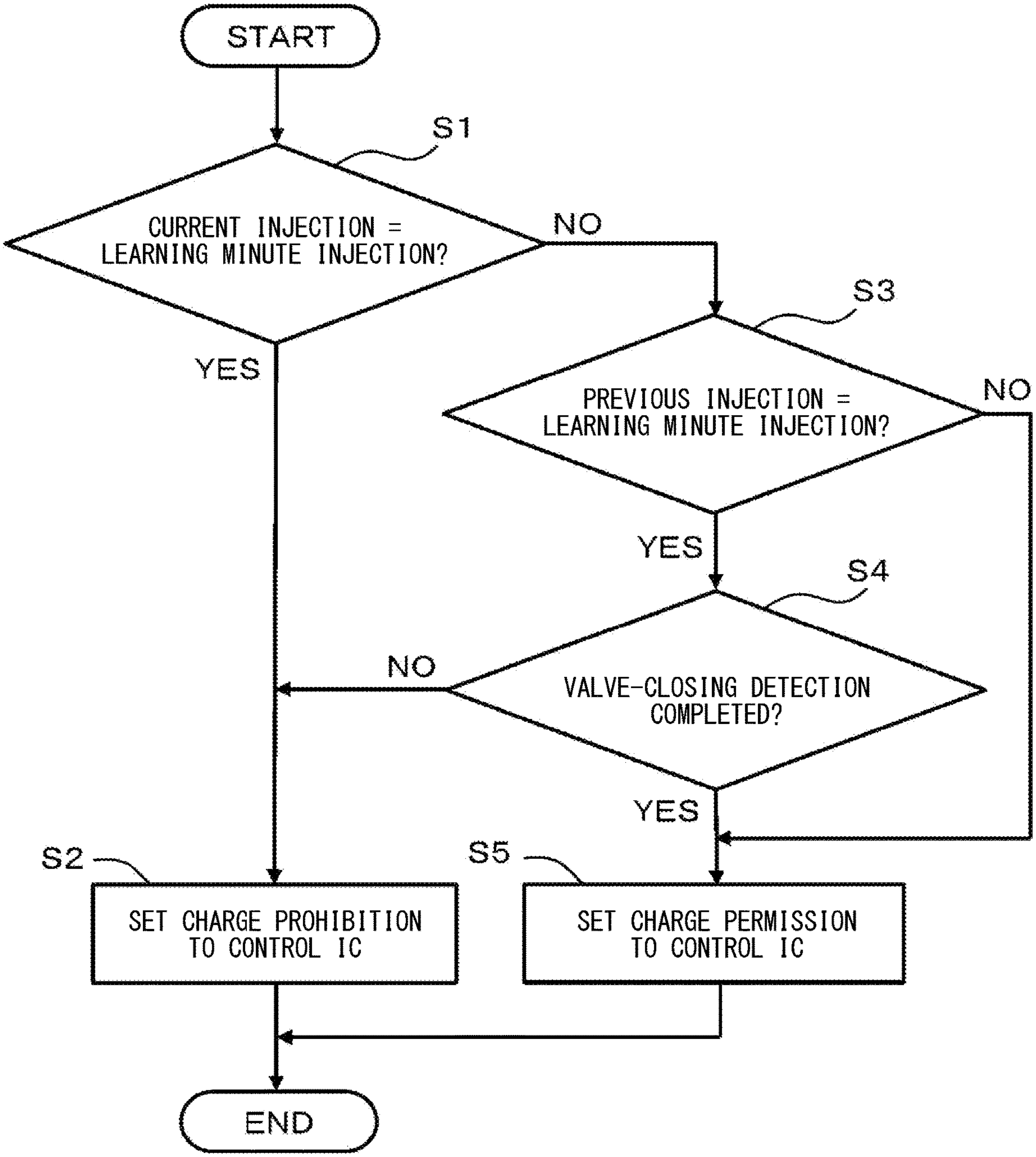
FIG. 3 is a flow chart.

Next, the operation of the above-described configuration will be described with reference to FIGS. 3 to 8. In the microcomputer 4, the core 10 starts a charge control process every time a start event of the charge control process occurs. As shown in FIG. 3, when the charge control process starts, the core 10 determines the current injection type, and determines whether the current injection is the learning minute injection (51). The current injection is the same as injection that is most recently performed. When determining the current injection is the learning minute injection (S1: YES), the core 10 outputs the charge prohibition command to the boosting control unit 5*a* and sets charge prohibition for the booster circuit 3 to the boosting control unit 5*a* (S2). After setting the charge prohibition for the booster circuit 3 to the boosting control unit 5*a*, the core 10 ends the charge control process and waits for the occurrence of the next start event.

When determining that the current injection is not the learning minute injection and determining that the current injection is the normal injection or the minute injection (S1: NO), the core 10 determines the previous injection type, and determines whether the previous injection is the learning minute injection (S3). When determining that the previous injection is the learning minute injection (S3: YES), the core 10 determines whether the closing valve detection has been completed (S4). When determining that the valve closing detection has not been completed (S4: NO), the core 10 outputs the charge prohibition command to the boosting control unit 5*a*, and sets the charge prohibition for the booster circuit 3 to the boosting control unit 5*a*.

When determining that the valve closing detection has been completed (S4: YES), the core 10 outputs a charge permission command to the boosting control unit 5*a*, and sets charge permission for the booster circuit 3 to the boosting control unit 5*a* (S5). After setting the charge permission for the booster circuit 3 to the boosting control unit 5*a*, the core 10 ends the charge control process and waits for the occurrence of the next start event.

When determining that the previous injection is not the learning minute injection (S3: NO), the core 10 sets the charger permission for the booster circuit 3 to the boosting control unit 5*a* (S5).

Figure 4:
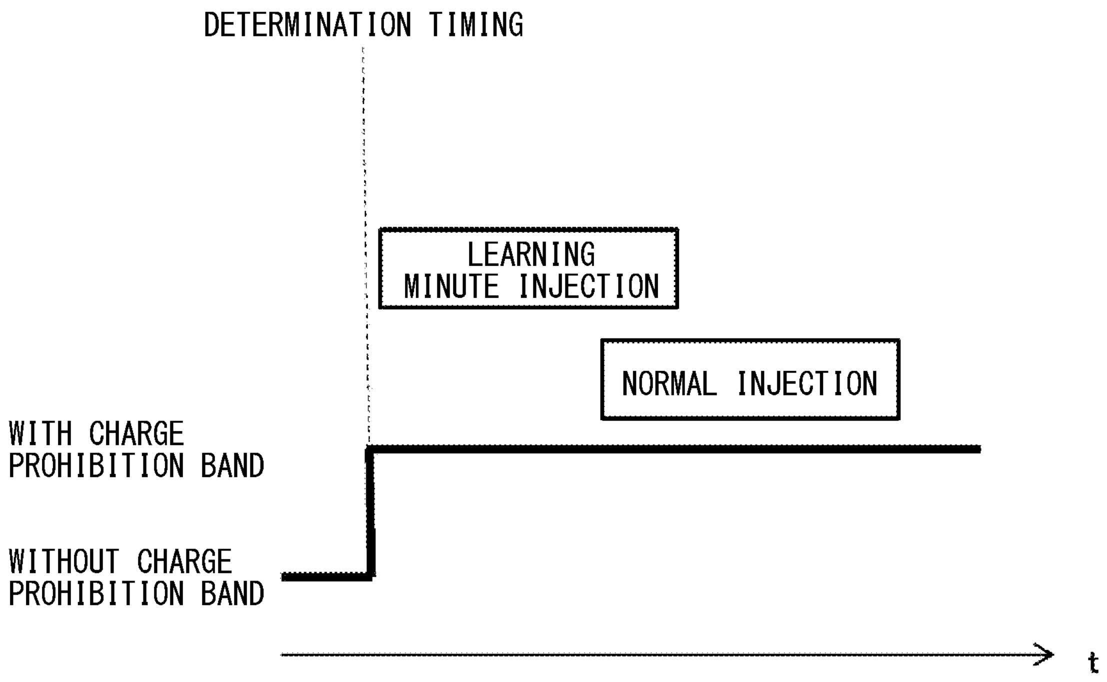
FIG. 4 is a diagram for describing a charge prohibition band (first part)
Figure 5:
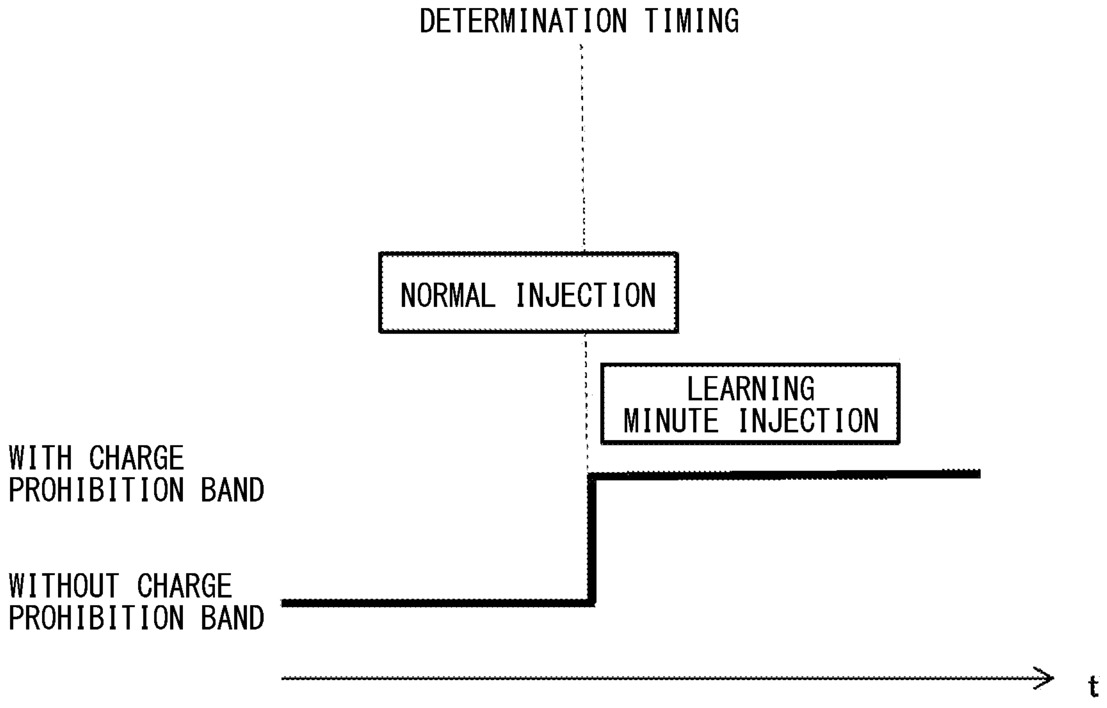
FIG. 5 is a diagram for describing the charge prohibition band (second part)

The core 10 switches the charge control of the booster circuit 3 as follows by executing the charge control process described above. As shown in FIGS. 4 and 5, at a determination timing for determining the current injection, while the charge permission is set to the boosting control unit 5*a*, when the core 10 determines that the current injection is the learning minute injection, the core 10 outputs the charge prohibition command to the boosting control unit 5*a*, sets the charge prohibition for the booster circuit 3 to the boosting control unit 5*a*, and switches the charge setting from the charge permission to the charge prohibition.

Figure 6:
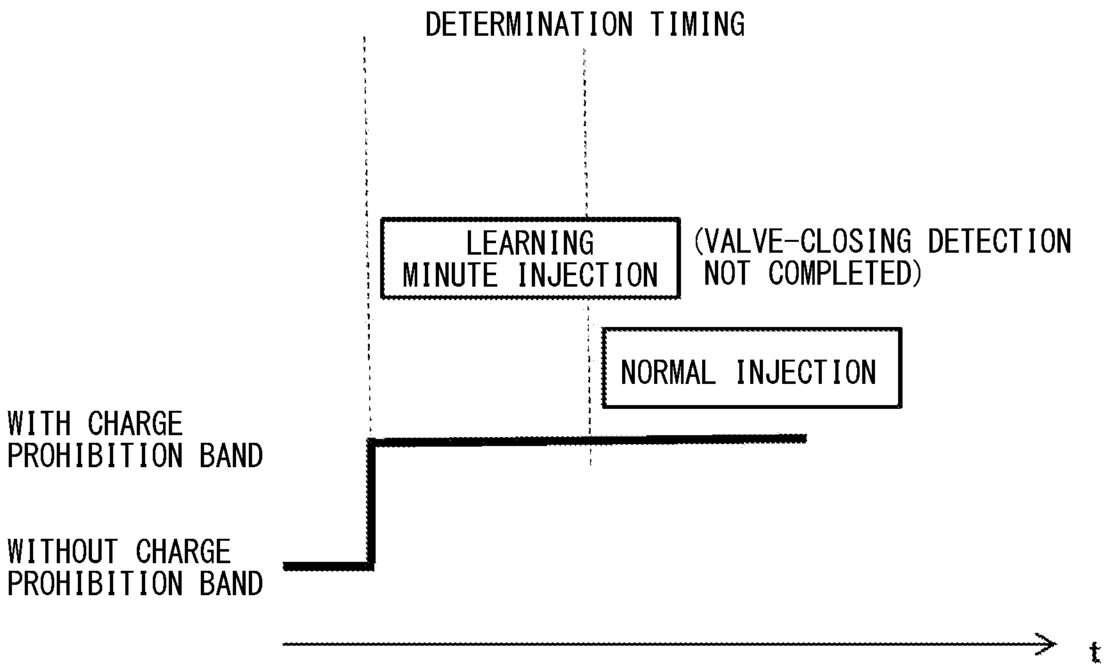
FIG. 6 is a diagram for describing the charge prohibition band (third part)

As shown in FIG. 6, when, while the charge prohibition is set to the boosting control unit 5*a* at the determination timing for determining the current injection, the core 10 determines that the current injection is injection different from the learning minute injection, determines that the previous injection is the learning minute injection, and determines that the valve-closing detection of the previous injection has not been completed, the core 10 outputs the charge prohibition command to the boosting control unit 5*a*, sets the charge prohibition for the booster circuit 3 to the boosting control unit 5*a*, and continues the charge prohibition.

Figure 7:
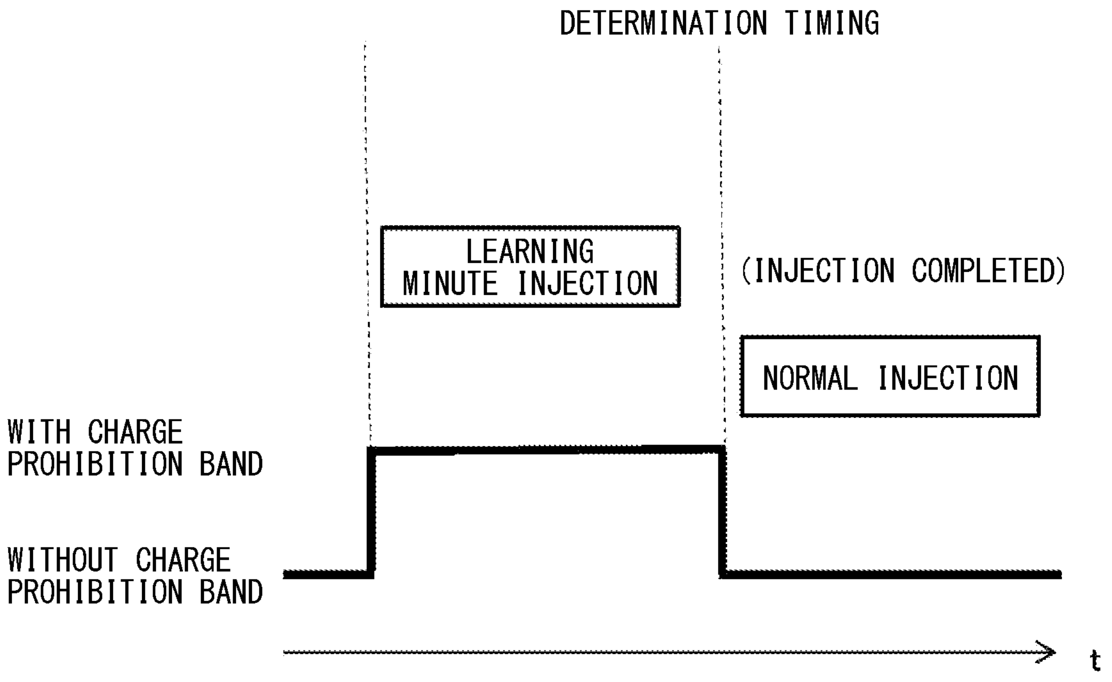
FIG. 7 is a diagram for describing the charge prohibition band (seventh part)

As shown in FIG. 7, when, while the charge prohibition is set to the boosting control unit 5*a* at the determination timing for determining the current injection, the core determines that the current injection is injection different from the learning minute injection, determines that the previous injection is the learning minute injection and determines that the previous injection has been completed, the core 10 outputs the charge permission command to the boosting control unit 5*a*, sets the charge permission for the booster circuit 3 to the boosting control unit 5*a*, and switches the charge setting from the charge prohibition to the charge permission.

Figure 8:
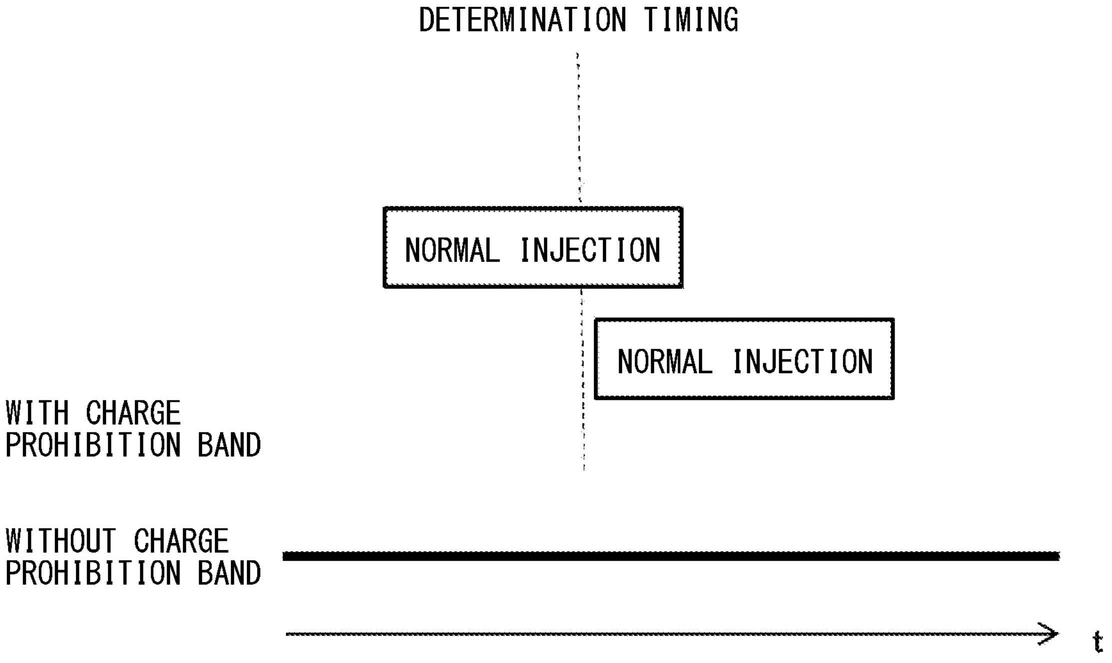
FIG. 8 is a diagram for describing the charge prohibition band (seventh part).

As shown in FIG. 8, at a determination timing for determining the current injection, while the charge permission is set to the boosting control unit 5*a*, when determining that the current injection is the normal injection and determining that the previous in is the normal injection, the core 10 outputs the charge permission command to the boosting control unit 5*a*, sets the charge permission for the booster circuit 3 to the boosting control unit 5*a*, and continues the charge permission.

As described above, according to the present embodiment, the following effects can be obtained. In the injection control device 1, it is selected whether to prohibit or permit the charging of the booster circuit 3 according to the injection type. In the case of a specific injection among multiple types of injections, the charge prohibition is set to the boosting control unit 5*a*, and the charging of the booster circuit 3 is prohibited. On the other hand, in the case of injection other than the specific injection, the charge permission is set to the boosting control unit 5*a*, and the charging of the booster circuit 3 is permitted. That is, in the case of the learning minute injection for performing the valve-closing detection learning, it is possible to appropriately improve the injection accuracy by prohibiting the charging of the booster circuit 3 to appropriately learn the valve-closing detection time. On the other hand, in the case of the normal injection or the minute injection other that the injection for performing the valve-closing detection learning, it is possible to appropriately secure the chargeable time by permitting the charging of the booster circuit 3. This eliminates the need for the booster circuit 3 to be a circuit chargeable at high speed, and it is possible to appropriately improve the injection accuracy by appropriately learning the valve-closing detection time and appropriately ensure the charge possible time, while avoiding concerns such as an increase in the size of the circuit and a cost increase.

Further, the valve-closing detection time is appropriately learned by determining that the current injection is the learning minute injection and switching the charge setting from the charge permission to the charge prohibition, so that the injection accuracy is appropriately improved. Further, when it is determined that the previous injection is the learning minute injection and it is determined that the valve-closing detection of the previous injection has not been completed, the charge prohibition is continued. Thereby, the valve-closing detection time is appropriately learned, so that the injection accuracy is appropriately improved. Further, when determining that the previous injection is the learning minute injection, the charge setting is switched from the charge prohibition to the charge permission. Thereby, it is possible appropriately secure the chargeable time.

The microcomputer 4 and the control IC 5 described above may be integrated, and in this case, it is desirable to use an arithmetic processing device capable of high-speed computing. The means and functions provided by the microcomputer 4 and the control IC 5 can be provided by software recorded in a substantial memory device and a computer, software, hardware, or a combination thereof for performing the software. For example, when the controller is provided by an electronic circuit that is hardware, the control device can include a digital circuit including one or more logic circuits, or an analog circuit. Further, for example, when the controller performs various kinds of control by software, a program is stored in the storage unit, and a method corresponding to the program is performed by the control body performing the program.

In addition, various changes can be made on the hardware configuration of the fuel injection valve, the booster circuit, the drive circuit, the current detection unit, and the like While the present disclosure has been described in accordance with the embodiment, it is understood that the present disclosure is not limited to such embodiments or structures. The present disclosure also encompasses various modified examples and modifications within a uniform range. In addition, various combinations and forms, as well as other combinations and forms including only one element, more than that, or less than that, are also within the scope and idea of the present disclosure.

The control unit and the method according to the present disclosure may be achieved by a dedicated computer provided by constituting a processor and a memory programmed to execute one or more functions embodied by a computer program. Alternatively, the control unit and the method according to the present disclosure may be achieved by a dedicated computer provided by constituting a processor with one or more dedicated hardware logic circuits. Alternatively, the control unit and the method according to the present disclosure may be achieved using one or more dedicated computers constituted by a combination of the processor and the memory programmed to execute one or more functions and the processor with one or more hardware logic circuits. The computer program may be stored in a computer-readable non-transitional tangible recording medium as an instruction to be executed by the computer.

The invention claimed is:

1. An injection control device configured to open and close a fuel injection valve by driving the fuel injection valve with a current to control fuel injection to an internal combustion engine, the injection control device comprising:

- a booster circuit configured to boost a battery voltage;
- a boosting control unit configured to perform boosting control on the booster circuit; and
- a charge control setting unit configured to set charge permission or charge prohibition for the booster circuit to the boosting control unit, wherein:

the charge control setting unit is configured to set the charge permission or the charge prohibition for the booster circuit to the boosting control unit according to an injection type, the injection control device further comprises an injection type determination unit configured to determine the injection type, and the charge control setting unit sets the charge prohibition to the boosting control unit when the injection type determination unit determines that the injection type is a learning minute injection, the learning minute injection being an injection that does not contribute to the driving of the internal combustion engine.

2. The fuel injection control device according to claim 1, wherein:

the charge control setting unit switches a charge setting from the charge permission to the charge prohibition when the injection type determination unit determines that a current injection is the learning minute injection while the charge permission is set to the boosting control unit.

3. The fuel injection control device according to claim 1, further comprising:

a valve-closing detection completion determination unit configured to determine whether valve-closing detection has been completed, wherein the charge control setting unit continues the charge prohibition when the injection type determination unit determines that a previous injection is the learning minute injection while the charge prohibition is set to the boosting control unit and when the valve-closing detection completion determination unit determines that valve-closing detection of the previous injection has not been completed.

4. The fuel injection control device according to claim 1, further comprising:

an injection completion determination unit configured to determine whether injection of the fuel injection valve is completed, wherein:

the charge control setting unit switches a charge setting from the charge prohibition to the charge permission, when the injection type determination unit determines that a current injection is an injection different from the learning minute injection while the charge prohibition is set to the boosting control unit, when the injection type determination unit determines that a previous injection is the learning minute injection, and when the injection completion determination unit determines that the previous injection has been completed.

5. The fuel injection control device according to claim 1, wherein:

the injection type is determined from among a normal injection, a minute injection, and the learning minute injection, the normal injection contributes to driving of the internal combustion engine, and the minute injection contributes to driving of the internal combustion engine but has a shorter injection time than that of the normal injection.

6. An injection control device configured to open and close a fuel injection valve by driving the fuel injection valve with a current to control fuel injection to an internal combustion engine, the injection control device comprising:

a booster circuit configured to boost a battery voltage;

a boosting control circuit configured to perform boosting control on the booster circuit; and a computer configured to set charge permission or charge prohibition for the booster circuit to the boosting control circuit, wherein:

the computer is configured to set the charge permission or the charge prohibition for the booster circuit to the boosting control circuit according to an injection type, the injection control device further comprises an injection type determination unit configured to determine the injection type, and the computer sets the charge prohibition to the boosting control circuit when the injection type determination unit determines that the injection type is a learning minute injection, the learning minute injection being an injection that does not contribute to the driving of the internal combustion engine.

7. The fuel injection control device according to claim 6, wherein:

the injection type is determined from among a normal injection, a minute injection, and the learning minute injection, the normal injection contributes to driving of the internal combustion engine, and the minute injection contributes to driving of the internal combustion engine but has a shorter injection time than that of the normal injection.

* * * * *